Nov. 22, 1927.
W. B. LANGAN
LICENSE PLATE HOLDER
Filed April 5, 1927
1,650,454
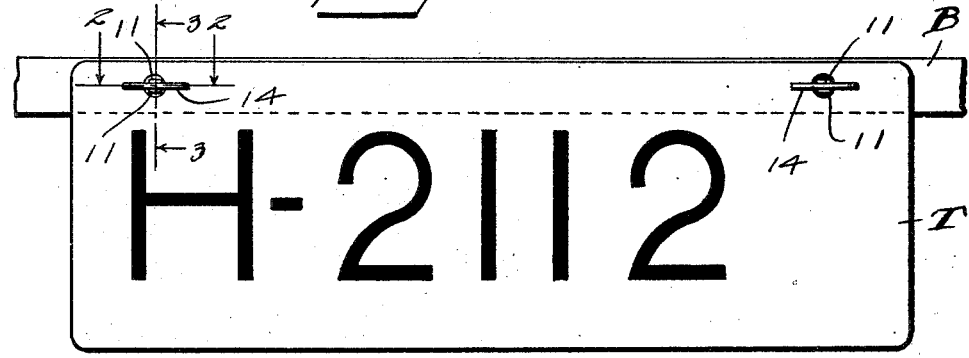
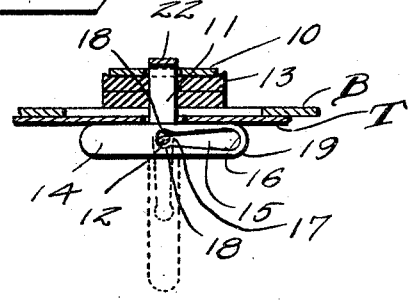
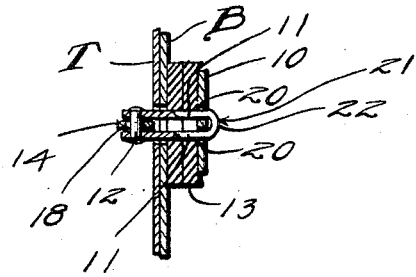
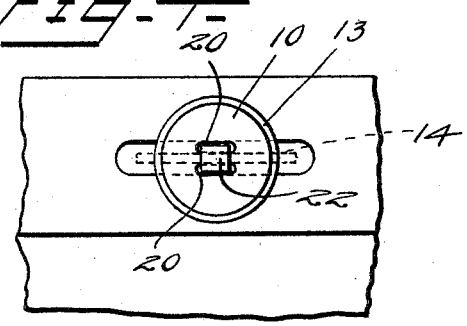
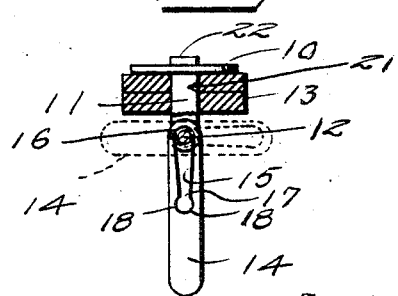
Inventor
W. B. Langan
By Watson E. Coleman
Attorney Patented Nov. 22, 1927.

1,650,454

UNITED STATES PATENT OFFICE.

WILLIAM B. LANGAN, OF HAWLEY, PENNSYLVANIA, ASSIGNOR OF ONE-THIRD TO ROBERT NAGEL AND ONE-THIRD TO MAURICE MARKS, BOTH OF NEW YORK, N. Y.

LICENSE-PLATE HOLDER.

Application filed April 5, 1927. Serial No. 181,148.

This invention relates to a license plate holder and more particularly to a device for attaching the license plates of vehicles to the brackets thereof.

An important object of the invention is to provide a device of this character which may be very readily installed and removed and which, in applied position, will not only firmly hold the license plate against movement, but will insure against rattling thereof.

A further object of the invention is to produce a device of this character which may be very readily and cheaply manufactured, which will be durable and efficient in service and a general improvement in the art.

These and other objects I attain by the construction shown in the accompanying drawings, wherein for the purpose of illustration is shown a preferred embodiment of my invention and wherein:—

Figure 1 is a rear elevation of a license plate attached to its bracket with fasteners constructed in accordance with my invention;

Figure 2 is an enlarged section on the line 2—2 of Figure 1;

Figure 3 is a similar section on the line 3—3 of Figure 1;

Figure 4 is an enlarged rear elevation of the fastener in applied position;

Figure 5 is a sectional view through the fastener, the securing arm being shown in solid lines positioned for extension through an opening in the plate and in dotted lines in its locking position.

Referring now more particularly to the drawings, the numeral 10 indicates a disk having extending outwardly therefrom at the center thereof a pair of arms 11, the outer ends of which are connected by a pivot pin 12. Surrounding the arms 11 and seating against the disk is a rubber washer or washers 13, the outer face of which is slightly spaced inwardly of the arms from the ends of the pivot pin 12.

The numeral 14 generally designates a locking bar having formed therein a slot 15 extending from one end of the locking bar at the approximate center thereof. This slot decreases in width from its outer end 16 to a point adjacent its inner end, where it is reduced to form a throat 17 of just sufficient size to admit of the passage of the pivot pin 12. Beyond the throat, the slot is again enlarged to form coves 18 in which the pivot pin 12 may seat.

The locking bar 14 is of the same width as the arms and both the arms and locking bar are of such size that they may be readily passed through the openings provided in the license plates and their supporting brackets, for the reception of securing elements. It will, of course, be obvious that when the pivot pin 12 is at the outer end 16 of the slot 15, the locking bar may be rotated until it aligns with the arms and the locking bar and outer ends of the arms projected through such openings. When this has been done, the locking bar is rotated until it extends transversely of the arms, this operation being facilitated by the rounding of the end of the locking bar to which the slot extends, as indicated at 19. The locking bar may then be forced longitudinally until the pin 12 passes the restricted throat 17 and enters one of the coves 18 of the slot. It will, of course, be understood that during movement of the inclined side wall of the slot of the locking bar along the pin, the washers 13 will be compressed so that the pin actually snaps into the cove and could only be removed therefrom by considerable pressure applied to the end of the locking bar. The washers will be of such thickness that they are held compressed, after the pin is engaged in the covers, so that their resiliency will at all times act to maintain the bracket B and license plate P in firm engagement with one another and prevent any tendency to rattling.

As a convenient method of producing the disk 10 and its arms 11, this disk is formed at opposite sides of its axial center with a pair of parallel slots 20. A strip of metal is bent in U-form, as generally designated at 21, and this strip, the end of which produce the arms 11, has these arms passed through the slots 20 until the cross bar 22 of the U comes in contact with the disk. The ends of the arms are then connected by the pin 12 and the U-shaped element 21 thus rendered unremovable from the disk.

Since the construction hereinbefore set forth is capable of a certain range of change and modification without materially departing from the spirit of the invention, I do not limit myself to such specific structure except as hereinafter claimed.

I claim:—

1. Means for securing plates to one another comprising a disk having a pair of parallel slots formed therethrough, a U-shaped member having the arms thereof directed through the disk and the connection between the arms thereof abutting the disk between said slots, a pivot pin connecting the outer ends of the arms, a cross bar having a longitudinally extending slot through which said pin is directed and movable about said pin to align with the arms when the pin is at one end of the slot, the opposite end of the slot being disposed inwardly of the ends of the arms and having coves at its opposite sides offset transversely of the bar from the adjacent portions of the walls of the slot and a cushioning element surrounding said arms.

2. Means for securing plates to one another comprising a disk having a pair of parallel slots formed therethrough, a U-shaped member having the arms thereof directed through the disk and the connection between the arms thereof abutting the disk between said slots, a pivot pin connecting the outer ends of the arms, a cross bar having a longitudinally extending slot through which said pin is directed and movable about said pin to align with the arms when the pin is at one end of the slot, the opposite end of the slot being disposed inwardly of the ends of the arms and having coves at its opposite sides offset transversely of the bar from the adjacent portions of the walls of the slot and a rubber washer surrounding said arms inwardly of the pivot thereof and adapted to interpose between the disk and a plate through which the arms are directed.

In testimony whereof I hereunto affix my signature.

WILLIAM B. LANGAN.